United States Patent Office 3,701,750
Patented Oct. 31, 1972

3,701,750
REINFORCED POLYETHYLENE
Renato C. Pomatti, Beacon, N.Y., assignor to
Texaco Inc., New York, N.Y.
No Drawing. Filed Dec. 10, 1969, Ser. No. 883,995
Int. Cl. C08f 45/10
U.S. Cl. 260—41        7 Claims

ABSTRACT OF THE DISCLOSURE

A solid polyethylene composition reinforced with between about 5 and 35 wt. percent glass fibers based on said composition, said fibers presoaked in a solution selected from the group consisting of aqueous mineral acid, aqueous alkali metal hydroxide and water.

DESCRIPTION OF THE PRIOR ART

In recent years inorganic fibers, for example, glass and asbestos have found increasing use in reinforcing plastic materials. These reinforced plastic compositions are useful as pipes, sheathings, rocket engine casings, boat mold, automobile bodies, fishing poles, archery bows and many other type products. One of the main factors in rendering these reinforced plastic articles suitable is their high tensile strength. Thus, in the field of the reinforced plastic compositions there is a continuing search for a means of improving tensile strength of the plastic materials. One means of improving the properties of the glass fiber reinforced plastic materials is to coat (size) the glass fibers prior to their incorporation in the plastic material to improve their bonding to the plastic matrix and in turn impart in some instances a greater tensile to the composition for a given glass fiber content. Such techniques are described in U.S. 2,372,048, 2,513,268, 3,251,540 and 3,441,466. Although this pretreatment effect was successful in the area of phenolic resins, diallyl phthalate resins, saturated polyester resins, epoxy resins, polydiolefin resins and polystyrene, the coating of glass fibers with solid chemical agents left much to be desired in improving the tensile strength of glass fiber filled polyethylene compositions.

SUMMARY OF INVENTION

I have discovered and this constitutes my invention a glass fiber filled polyethylene composition of substantialy improved tensile strength. More specifically, I have found when the glass reinforcing fibers are soaked in a liquid selected from the group consisting of aqueous mineral acid, aqueous alkali metal hydroxde and water prior to their incorporation into the polyethylene material there unexpectedly results a reinforced polyethylene composition of tensile strength substantially greater than the tensile strength of polyethylene reinforced glass fibers not so treated. The invention is emphasized by the fact that the so treated glass fibers incorporated in ABS resins (acrylonitrile-butadiene-styrene polymers) have poorer tensile strength values in respect to untreated glass fiber filled ABS resins. Further, polyethylene composition reinforced with sized glass fibers further treated with aqueous solution contemplated herein, actually give poorer tensile strength compositions than untreated sized fiber containing compositions.

DETAILED DESCRIPTION OF THE INVENTION

Specifically, my invention comprises a glass fiber reinforced polyethyene solid material consisting essentially of between about 65 and 95 wt. percent of a solid polyethylene matrix phase and between about 5 and 35 wt. percent of a glass fiber phase essentially uniformly dispersed therethrough, said glass fiber presoaked in a liquid selected from the group consisting of water, between about 0.5 and 20 wt. percent aqueous mineral acid and between about 0.5 and 20 wt. percent aqueous alkali metal hydroxide, said glass fibers normally of an average diameter of between about 0.2 and 5.2 microns and average length of between about $\frac{1}{16}$ and $\frac{3}{4}$ inch.

The polyethylene component as contemplated herein can be characterized as a synthetic resin solid having a density of between about 0.90 and 0.97 g./cm.$^3$, a molecular weight ranging between about 15,000 and 80,000, a crystallinity ranging between about 40 and 95 wt. percent, and a crystalline melting point ranging between about 105 and 135° C. The treated glass fibers as contemplated herein have been found particularly effective in increasing the tensile strength of low density polyethylene, low density polyethylene being defined as having a density between about 0.90 and 0.94 g./cm.$^3$, a molecular weight between about 15,000 and 75,000, a crystallinity of between about 45 and 65%, and a crystalline melting point between about 105 and 125° C.

The glass fibers employed can be any of the glasses suitable for fabrication as a fibrous structure such as E-glass (lime aluminaborosilicate), T-glass (soda lime aluminaborosilicate), C-glass (soda lime borosilicate), S-glass (magnesium aluminasilicate), borosilicate glass, fused silica glass.

Examples of the mineral acids and alkali metal hydroxides contempated herein are hydrochloric acid, sulfuric acid, sodium hydroxide and potassium hydroxide.

In regard to the pretreatment of the glass fibers, the glass fibers are advantageously immersed in the treating solution for a period of from 0.5 to 72 hours, preferably between about 1 and 3 hours, normally at a temperature between about 10 and 50° C., preferably between about 20 and 30° C. During the soaking the glass fibers and/or soaking liquid are preferably agitated during liquid treatment in order to insure continuous fiber surface contact with fresh liquid. At the end of the contact time the treating liquid is thoroughly removed from the fiber surface. In the case of water treatment this is generally accomplished by pressing or squeezing out the excess water, drying the fiber at a temperature advantageously below about 300° C., preferably between about 100 and 120° C. In the case of aqueous mineral acid and alkali metal hydroxide treating liquids removal of these liquids is normally accomplished by washing the fiber surface with water until a neutral pH is indicated followed by removing the wash water, e.g., by drying as heretofore described in respect to water treatment. It is to be noted that drying temperature of the glass fibers above about 300° C. adversely effects the tensile strength of the final reinforced polyethyene composition, and therefore, should be avoided.

In regard to the incorporation of the treated glass fibers into polyethylene resin one means of accomplishing said incorporation is in milling to first render the resin molten such as pouring polyethylene pellets in the gap between two heated rolls at least one of said rolls maintained above the melting point of the polyethylene and after the polyethylene has become molten, adding incrementally at the gap small increments of glass fibers to the molten mass subsequently solidifying the resultant composition, e.g., by reducing the temperature of the molten mass to between about 10 and 30° C. and recovering sheets of the fiber glass reinforced polyethylene.

The following examples further illustrate the compositions of the invention and their preparation but are not to be construed as limitations thereof.

Example I

This example illustrates glass fiber filled polyethylene compositions wherein the glass fibers have been pretreated with aqueous sodium hydroxide.

Forty-two grams of lime aluminaborosilicate glass fibers ranging in average diameter from 2.6 to 3.8 microns were soaked in aqueous sodium hydroxide solutions of various concentrations for periods of time rangiig from 3 to 72 hours. The soaking period and all other chemical treatments of the glass fibers were done at room temperature (about 22 C.). A photographic tray was used for the soaking with occasional agitation of the glass fibers therein. At the end of the soaking period, the fibers were thoroughly washed with water to remove all traces of caustic as indicated by pH paper measurements. Excess water was removed via squeezing and the fibers were spread out overnight in an oven at about 104° C. Thus thus treated glass fibers were then incorporated via a milling and molding in low density polyethylene of a density of about 0.91 g./cm.$^3$ and a Melt Index of 2.0 g./10 min.

In respect to the milling and molding procedure, the blends were made by slowly pouring weighed polyethylene pellets into a 0.030" gap between the hot rolls of a two-roll laboratory mill, said rolls respectively maintained at 75 and 135° C. After all the polyethylene had become molten, the weighed glass fibers were added in small increments to the molten mass. The resultant mixture was then cut frequently off the rolls and fed back between the two rolls at right angles to insure better mixing. After about 15 minutes the crepe was removed from the mill in the form of flat sheets of about 6" x 20". For determination of the tensile properties the sheets were molded 10 mils thick and 6½" x 10" in area. In respect to the molding procedure a piece of milled crepe of about 3" x 7" and weighing about 15 grams was used to mold a 10 mil sheet. The piece of crepe was placed in the frame mold with the long dimensions of each in the same direction. The sample and frame were placed between two sheets of a plastic film and this sandwich placed between two chrome plated steel back up plates. The whole assembly was placed between the heated platens of the press which then closed in firm contact for four minutes to melt the polymer crepe. Pressure was raised to 25 tons guage and held for four minutes. For low density polyethylene blends a molding temperature of 160° C. was employed whereas the high density polyethylene blends were molded at 181° C. After the 8 minute cycle the platens were quickly separated and the sandwich was removed and placed on a metal bench with a large metal weight on top to hold sandwich flat and expedite removal of heat. The tensile strength measurement was conducted on the length of the test strips.

Specific test data and results are reported below in Table I:

TABLE I

| | Treatment of glass fibers | | | |
|---|---|---|---|---|
| Run Number: | NaOH conc., wt. percent | Time, hours | Fiber content, wt. percent | Tensile strength p.s.i. |
| A | 0 | 0 | 0 | 1,220 |
| B [1] | 0 | 0 | 20 | 1,400 |
| C | 5 | 72 | 20 | 1,700 |
| D | 10 | 72 | 20 | 1,950 |
| E | 15 | 72 | 20 | 2,030 |
| F | 15 | 3 | 20 | 1,810 |
| G | 15 | 24 | 20 | 2,440 |
| H | 20 | 72 | 20 | 1,890 |

[1] Average of 22 runs.

Example II

This example illustrates aqueous hydrochloric acid treated glass fiber filled polyethylene compositions and their method of preparation.

The glass fiber, polyethylene, milling, molding and testing procedure were those described in Example I. The fiber pretreatment procedure was also the same as Example I will the exception that the sodium hydroxide was replaced with 18 wt. percent aqueous hydrochloric acid.

The test data and results are reported below in Table II:

TABLE II

| Run Number | Fiber pretreatment, hrs. | Fiber content, wt. percent | Tensile strength, p.s.i. |
|---|---|---|---|
| A | 0 | 0 | 1,220 |
| B [1] | 0 | 20 | 1,400 |
| I | 3 | 20 | 2,060 |
| J | 24 | 20 | 2,080 |
| K | 72 | 20 | 1,920 |

[1] Average of 22 runs.

Example III

This example illustrates water treated glass fiber filled polyethylene compositions and their method of preparation.

The polyethylene, glass fiber, milling, molding testing procedures were those employed in Example I. In respect to the pretreatment procedure, the glass fibers were soaked in water for a period of 0.5 to 24 hours, the excess water was then squeezed out and the fibers dried in an oven overnight at temperature of about 104° C. The specific test data and results are reported below in Table III:

TABLE III

| Run Number | $H_2O$ Pre-treatment of fiber | Fiber content, wt. percent | Tensile strength, p.s.i. |
|---|---|---|---|
| A | None | 0 | 1,220 |
| B [1] | None | 20 | 1,400 |
| L | 24 | 20 | 1,870 |
| M | 0.5 | 20 | 1,690 |
| N | 4.5 | 20 | 1,710 |
| O | 6 | 20 | 2,050 |

[1] Average of 22 runs.

Example IV

This example illustrates the importance of the chemical character of the resin matrix for the pretreatment of the glass fibers to improve tensile strength.

The tensile properties of an ABS resin (Cycolac L) and of this resin reinforced with 20% untreated and treated borosilicate glass fibers were tested. As expected the tensile properties were increased considerably with the addition of the glass fibers. However, when the glass fibers, treated with water and hydrochloric acid, were incorporated in the ABS resin matrix there was a decrease in the tensile strength of the resultant fiber glass reinforced ABS compositions in respect to the untreated fiber compositions. In contrast, when polyethylene is employed as the matrix the treatment causes a substantial increase in tensile strength.

The glass fibers, milling, molding, treating and tensile strength testing procedures were those described in Example I. The ABS resin employed had the following properties:

| Property | Value |
|---|---|
| Tensile strength, p.s.i. | 4,240 |
| Elastic modulus, p.s.i. | 211,000 |

The test data are summarized below in Table IV:

TABLE IV

| Run | Resin | Fiber pretreatment | Hours treatment | Wt. percent fiber | Tensile strength, p.s.i. |
|---|---|---|---|---|---|
| A | Poly E | None | 0 | 0 | 1,220 |
| B | do | do | 0 | 20 | 1,400 |
| N | do | H₂O | 4.5 | 20 | 1,710 |
| I | do | 18 wt. percent aq. HCl | 3 | 20 | 2,060 |
| P | ABS | None | 0 | 0 | 4,240 |
| Q | ABS | do | 0 | 20 | 5,620 |
| R | ABS | H₂O | 3 | 20 | 5,410 |
| S | ABS | 9 wt. percent aq. HCl | 3 | 20 | 5,510 |

Example V

This example illustrates glass fiber filled high density polyethylene compositions.

The procedure of Example III was essentially repeated with the exception that the polyethylene employed was a high density polyethylene having a density of 0.96 grams/cm.³ and a Melt Index of 0.9 gram/10 min. Further, in the milling procedure the front roll was maintained at 150° C. and the back roll at 135° C. The test data and results are reported below in Table V:

TABLE V

| Run number | Fiber pretreatment | Fiber content, wt. percent | Tensile strength, p.s.i. |
|---|---|---|---|
| T | None | 0 | 4,070 |
| U | do | 26 | 3,780 |
| V | H₂O, 24 hrs., room temp | 26 | 4,720 |

Example VI

This example still further illustrates the criticalities of the invention.

The procedure and materials were generally those of Example III with the following exception.

The lime alumina borosilicate glass fibers were all ¼" or ½" lengths and of about 0.0001 inch diameter and were sized with an amino silane or a vinyl silane. The treatment of the sized fibers consisted of soaking in 20 wt. percent aqueous hydrochloric acid for 6 hours.

The test data and results reported below in Table VI demonstrate that the chemical coating (sizing) of these glass fibers render the contemplated pretreatment ineffective in improving tensile strength:

TABLE VI

| Run number | Type of fiber | Fiber treatment | Tensile strength percent inc. over untreated fibers in LDPE | Tensile strength percent inc. over pure LDPE |
|---|---|---|---|---|
| W | ¼" amino silane sized | 6 hrs., 20% aq. HCl | None | 47 |
| X | ½" vinyl silane sized | do | do | 74 |

I claim:

1. A reinforced polyethylene composition consisting essentially of between about 65 and 95 wt. percent of a solid polyethylene matrix phase having essentially uniformly distributed therethrough between about 5 and 35 wt. percent pretreated glass fibers, the pretreatment of said glass fibers consisting essentially of contacting said fibers with a liquid selected from the group consisting of, between about 0.5 and 20 wt. percent aqueous mineral acid and between about 0.5 and 20 wt. percent aqueous alkali metal hydroxide and subsequently removing the residue of said liquid from said fibers.

2. A composition in accordance with claim 1 wherein said polyethylene is low density polyethylene and said glass is a lime alumina borosilicate glass.

3. A composition in accordance with claim 2 wherein said liquid is aqueous sodium hydroxide.

4. A composition in accordance with claim 2 wherein said liquid is hydrochloric acid.

5. A composition in accordance with claim 3 wherein said removing comprises washing said fiber with water until neutral and heating said fibers until dry.

6. A composition in accordance with claim 4 wherein said removing comprises washing said fiber with water until neutral and heating the washed fiber until dry.

7. A composition in accordance with claim 1 wherein said polyethylene is low density polyethylene, said mineral acid is hydrochloric acid, said alkali metal hydroxide is sodium hydroxide, said contacting is conducted at a temperature between about 10 and 50° C., and said fibers are of an average diameter between about 0.2 and 5.2 microns and an average length between about 1/16 and ¾ inch.

References Cited

UNITED STATES PATENTS

| | | | |
|---|---|---|---|
| 2,303,756 | 12/1942 | Nordberg et al. | 156—24 |
| 2,461,841 | 2/1949 | Nordberg | 156—24 |
| 3,164,563 | 1/1965 | Maxwell et al. | 260—37 |
| 3,498,774 | 3/1970 | Saffadi | 156—24 |

MORRIS LIEBMAN, Primary Examiner

J. H. DERRINGTON, Assistant Examiner

U.S. Cl. X.R.

65—31; 156—24